(12) United States Patent
Szczepanski (10) Patent No.: US 10,731,537 B2
(45) Date of Patent: Aug. 4, 2020

(54) REGENERATION COMPLIANCE SYSTEMS FOR LOCATION BASED MANAGEMENT OF PARTICULATE FILTER REGENERATION

(71) Applicant: Denso International America, Inc., Southfield, MI (US)

(72) Inventor: Edward Szczepanski, Grosse Pointe Woods, MI (US)

(73) Assignee: DENSO International America, Inc., Southfield, MI (US)

( * ) Notice: Subject to any disclaimer, the term of this patent is extended or adjusted under 35 U.S.C. 154(b) by 238 days.

(21) Appl. No.: 15/716,800

(22) Filed: Sep. 27, 2017

(65) Prior Publication Data

US 2019/0093538 A1 Mar. 28, 2019

(51) Int. Cl.
*F01N 3/023* (2006.01)
*F01N 9/00* (2006.01)
(Continued)

(52) U.S. Cl.
CPC .............. *F01N 9/002* (2013.01); *B60W 10/30* (2013.01); *B60W 40/02* (2013.01); *F01N 3/023* (2013.01);
(Continued)

(58) Field of Classification Search
CPC .............. B60W 10/30; B60W 2530/12; B60W 2550/141; B60W 40/02; F01N 2560/08; F01N 2590/08; F01N 2900/10; F01N 2900/102; F01N 2900/12; F01N 2900/1602; F01N 2900/1606; F01N 3/023; F01N 9/002; G01C 21/34
(Continued)

(56) References Cited

U.S. PATENT DOCUMENTS 8,667,784 B2 * 3/2014 Suzuki .................... F01N 3/023
60/295
9,358,986 B2 * 6/2016 Hunt .................... F02D 41/2487
(Continued)

FOREIGN PATENT DOCUMENTS

FR 2998237 * 5/2014
JP 2010059832 A 3/2010
(Continued)

*Primary Examiner* — Hai H Huynh
*Assistant Examiner* — Diem T Tran
(74) *Attorney, Agent, or Firm* — Harness, Dickey & Pierce, P.L.C.

(57) ABSTRACT

A regeneration compliance system is provided and includes navigation, regeneration, zone and timing modules. The navigation module determines a location of a vehicle. The regeneration module determines a state of a PF of an exhaust system of an engine of the vehicle and whether to regenerate the PF based on the state of the PF. The zone module, based on the location of the vehicle, determines whether the vehicle is in a regeneration permitted zone and where regeneration permitted and prohibited zones are located relative to the vehicle. The timing module estimates time to a next regeneration permitted zone or an amount of time remaining in a current regeneration permitted zone. The regeneration module controls when the PF is regenerated based on (i) the state of the PF, and (ii) the time to the next regeneration permitted zone or the amount of time remaining in the current regeneration permitted zone.

20 Claims, 8 Drawing Sheets

(51) Int. Cl.
*B60W 10/30* (2006.01)
*B60W 40/02* (2006.01)
*G01C 21/34* (2006.01)

(52) U.S. Cl.
CPC ......... *G01C 21/34* (2013.01); *G01C 21/3461* (2013.01); *B60W 2530/12* (2013.01); *B60W 2552/05* (2020.02); *F01N 2560/08* (2013.01); *F01N 2590/08* (2013.01); *F01N 2900/10* (2013.01); *F01N 2900/102* (2013.01); *F01N 2900/12* (2013.01); *F01N 2900/1602* (2013.01); *F01N 2900/1606* (2013.01)

(58) Field of Classification Search
USPC .................................. 60/285, 295, 297, 311
See application file for complete search history.

(56) References Cited

U.S. PATENT DOCUMENTS

| | | |
|---|---|---|
| 2011/0225949 A1 | 9/2011 | Tewari et al. |
| 2013/0074481 A1* | 3/2013 | Miura .................. F02D 41/029 60/311 |
| 2013/0133315 A1* | 5/2013 | Shibutani ................ F01N 9/002 60/311 |
| 2015/0260074 A1 | 9/2015 | Argolini et al. |
| 2017/0082446 A1 | 3/2017 | Long |

FOREIGN PATENT DOCUMENTS

| | | | |
|---|---|---|---|
| JP | 2011080428 | * | 4/2011 |
| JP | 5240449 | * | 7/2013 |

* cited by examiner

REGENERATION COMPLIANCE SYSTEMS FOR LOCATION BASED MANAGEMENT OF PARTICULATE FILTER REGENERATION

FIELD

The present disclosure relates to regeneration of particulate filters of an exhaust system of a vehicle.

BACKGROUND

The background description provided here is for the purpose of generally presenting the context of the disclosure. Work of the presently named inventors, to the extent it is described in this background section, as well as aspects of the description that may not otherwise qualify as prior art at the time of filing, are neither expressly nor impliedly admitted as prior art against the present disclosure.

An after treatment system of an internal combustion engine (ICE) of a vehicle can include a particulate filter. The particulate filter filters particulate matter (or soot) from exhaust gas emitted from the ICE. During operation particulate matter accumulates in the particulate filter and as a result the particulate filter needs to be regenerated. Passive or active regeneration may be performed to burn off the accumulated particulate matter.

Passive regeneration occurs during operation of the vehicle, for example, when an engine is operated in a rich or a high loaded condition and as a result heats the particulate filter to a temperature (e.g., 600° C.) that causes regeneration of the particulate filter. Active regeneration can include a vehicle controller operating an ICE and/or an active regeneration system to cause regeneration of the particulate filter. As an example, a vehicle controller may determine that a particulate filter needs to be regenerated and as a result supplies current to a heating element at an input of the particulate filter. The heating element initiates a thermal reaction that causes the particulate matter to ignite and be burned off.

SUMMARY

A regeneration compliance system is provided and includes a navigation module, a regeneration module, a zone module and a timing module. The navigation module is configured to determine a location of a vehicle. The regeneration module is configured to (i) determine a state of a particulate filter of an exhaust system of an engine of the vehicle; and (ii) determine whether to regenerate the particulate filter based on the state of the particulate filter. The zone module is configured to, based on the location of the vehicle, determine (i) whether the vehicle is in a regeneration permitted zone, and (ii) where regeneration permitted zones and regeneration prohibited zones are located relative to the vehicle. The timing module is configured to estimate at least one of (i) time to a next regeneration permitted zone, or (ii) an amount of time remaining in a current regeneration permitted zone. The regeneration module is configured to control when the particulate filter is regenerated based on (i) the state of the particulate filter, and (ii) at least one of the time to the next regeneration permitted zone or the amount of time remaining in the current regeneration permitted zone.

In other features, a method of controlling timing and location of regeneration of a particulate filter of an exhaust system of an engine of a vehicle is provided. The method includes: determining a location of the vehicle; determining a state of the particulate filter; determining whether to regenerate the particulate filter based on the state of the particulate filter; determining whether the vehicle is in a regeneration permitted zone based on the location of the vehicle; and determining where regeneration permitted zones and regeneration prohibited zones are located relative to the vehicle. The method further includes: estimating at least one of (i) time to a next regeneration permitted zone, or (ii) an amount of time remaining in a current regeneration permitted zone; and controlling when the particulate filter is regenerated based on (i) the state of the particulate filter, and (ii) at least one of the time to the next regeneration permitted zone or the amount of time remaining in the current regeneration permitted zone.

Further areas of applicability of the present disclosure will become apparent from the detailed description, the claims and the drawings. The detailed description and specific examples are intended for purposes of illustration only and are not intended to limit the scope of the disclosure.

BRIEF DESCRIPTION OF THE DRAWINGS

The present disclosure will become more fully understood from the detailed description and the accompanying drawings, wherein.

In the drawings, reference numbers may be reused to identify similar and/or identical elements.

DETAILED DESCRIPTION

During regeneration of a particulate filter (PF), temperature of the PF can be greater than or equal to 600° C. Temperatures of exhaust system components and/or of an exhaust emitted from a tail pipe of an engine as a result of PF regeneration can be greater than that needed to ignite dry materials (e.g., paper) and/or dry vegetation (e.g., grass). To prevent ignition of dry materials and/or vegetation, regeneration may be restricted to regeneration permitted zones. A "regeneration permitted zone" refers to a geographical location and/or area in which regeneration is permitted. Regeneration may also be prevented from occurring in regeneration prohibited zones, such as zones with strict emission regulations. A "regeneration prohibited zone" refers to a geographical location and/or area in which regeneration is limited and/or prohibited. For example, regeneration may be prevented in public areas, on hospital properties, on school properties, at public transit bus stops, in parks, at libraries, in off-road locations, on access ways (e.g., on-ramps and off-ramps), at municipalities, on business properties, etc. Regeneration of a PF may be limited to paved surfaces, other suitable surfaces, and/or designated regeneration permitted zones.

Regeneration compliance systems and methods are set forth herein that include limiting regeneration to regeneration permitted zones and managing timing and locations at which regeneration is performed. The regeneration compliance systems route vehicles and/or instruct vehicle operators to direct a vehicle to regeneration permitted zones when certain conditions exist. Timing of regeneration and routing of vehicles to regeneration permitted zones is implemented to maintain performance (e.g., filtering performance and exhaust system flow rates) of after treatment systems of the vehicles above predetermined levels.

Figure 1:
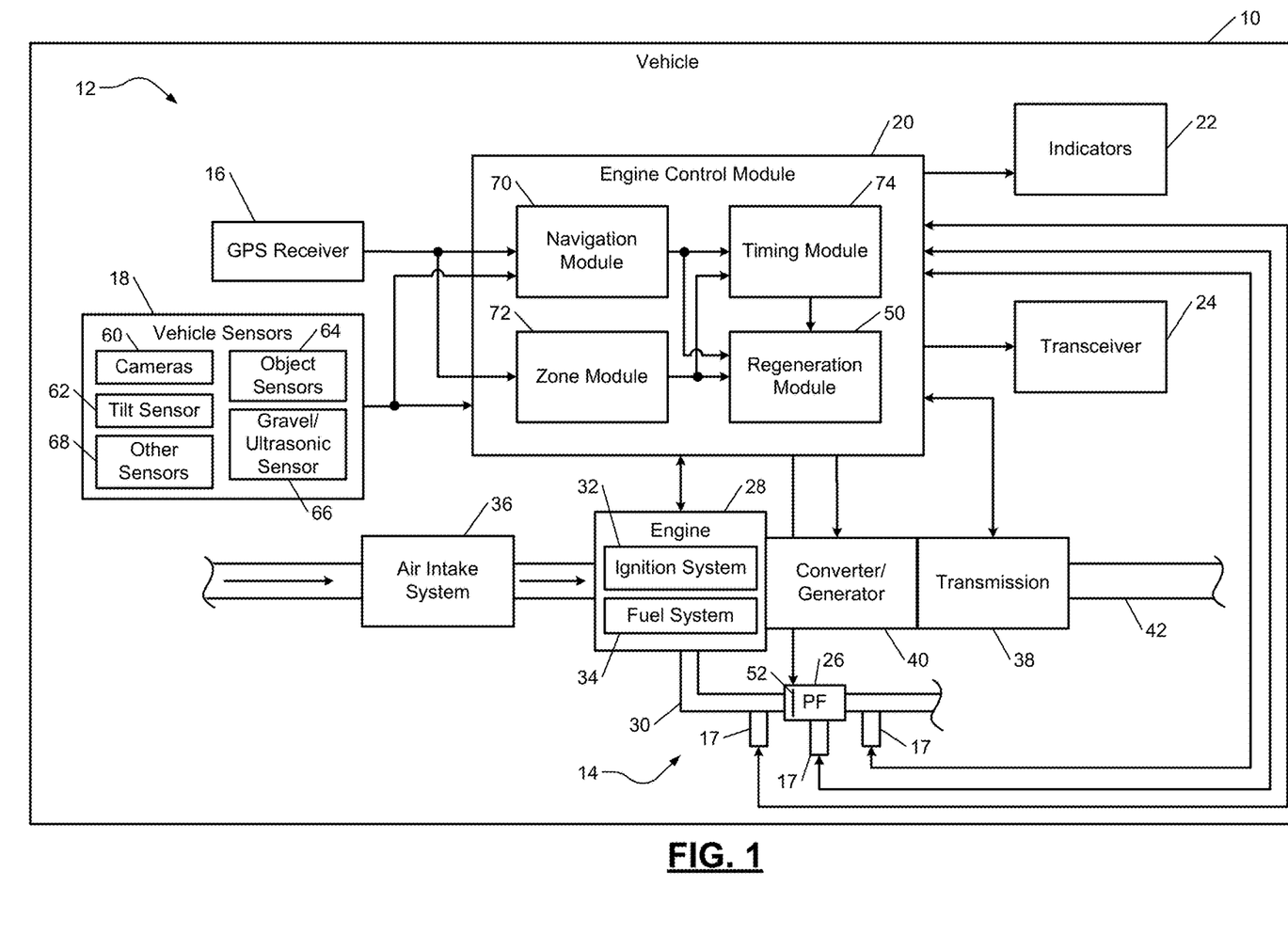
FIG. 1 is a functional block diagram of an example of a regeneration compliance system including a regeneration module in accordance with an embodiment of the present disclosure.

FIG. 1 shows a vehicle 10 that includes a regeneration compliance system 12 and an after treatment system (ATS) 14. The regeneration compliance system 12 includes a global positioning system (GPS) receiver 16, ATS sensors 17 and vehicle sensors 18, an engine control module 20, indicators 22, and a transceiver 24 including a regeneration module. The regeneration compliance system 12 controls regeneration of a particulate filter (PF) 26 of the ATS 14. The after treatment system 14 includes the PF 26, which is connected to an output of an engine 28 via exhaust conduits 30. The engine 28 may be a gasoline engine, a diesel engine, or other internal combustion engine and includes an ignition system 32 and a fuel system 34. The ignition system 32 may include, for example, spark plugs or glow plugs, operations of which are controlled by the engine control module 20. The fuel system 34 may include a fuel rail and fuel injectors, which are controlled by the engine control module 20. An air intake system 36 receives and controls air flow to the engine 28. The air intake system 36 may include a throttle. A position of the throttle may be controlled by the engine control module 20. The engine 28 may be connected to a transmission 38 via a converter and/or generator 40 to drive a driveshaft 42.

The ATS sensors 17 may each be a temperature sensor, a pressure sensor and/or a combination thereof. Although a particular number of ATS sensors 17 are shown, any number of sensors may be included in the ATS system 17. The ATS sensors detect inlet, outlet, and internal temperatures and pressures of the PF 26. In an embodiment, a regeneration module 50 of the engine control module 20 determines a pressure differential across the PF 26 to determine a particulate fill level or percentage of the PF 26 that is not regenerated. For example, if a predetermined percentage (e.g., 80%) of the PF 26 is not regenerated, then the regeneration module 50 may determine that the PF 26 is due for regeneration and perform tasks to actively regenerate the PF 26. This may include operating the engine 28 to heat the PF 26 to a temperature to regenerate the PF 26. In one embodiment, the regeneration module 50 controls current to one or more heating elements (one heating element 52 is shown) to heat at least a portion of the PF 26 and cause regeneration of the PF 26. Other techniques may be performed to regenerate the PF 26.

The vehicle sensors 18 detect a state of surroundings of the vehicle 10 and statuses of vehicle devices. The vehicle sensors 18 may include cameras 60, a tilt sensor 62, object sensors 64 (e.g., radar sensors), a gravel and/or ultrasonic sensor 66, and/or other sensors 68. The cameras 60 and the gravel and/or ultrasonic sensor 66 may be used to detect a type of surface that the vehicle 10 is on, such as a paved surface (or paved road), a gravel surface (or gravel road), a surface including vegetation, and/or other surface. The cameras 60 may also be used to detect whether the vehicle 10 is located in a lane of a road, on a shoulder of the road, or off the road. The cameras 60 and the object sensors 68 may be used to detect objects surrounding the vehicle 10. The tilt sensor 62 may be used to determine whether the vehicle 10 is on a level surface and/or on a shoulder of a road. The other sensors 68 may include, for example, a humidity sensor, a vehicle speed sensor and engine state sensors (e.g., temperature sensors, a speed sensor, etc.). Information from the sensors 17, 18 is received at the engine control module 20. The engine control module 20 and the other modules thereof may perform tasks based on this information. The humidity sensor may provide an output indicative of a whether surrounding objects are in a dry state.

The engine control module 20 includes the regeneration module 50, a navigation module 70, a zone module 72 and a timing module 74. The navigation module 70 determines a location of the vehicle 10 based on location information received by the GPS receiver 16 and/or from the transceiver 24. The transceiver 24 may receive location related information from, for example, cell towers, base stations, or buildings from which wireless signals (e.g., wireless fidelity (Wi-Fi) signals), beacon signals, and/or other signals are transmitted containing location related information. The navigation module 70 may determine a location of the vehicle 10 based on the location related information, which may be indicative of the location of the vehicle 10 and/or other network devices. The location related information may include distances between objects, periods of time to transmit or receive signals, strength of transmitted signals, location data, and/or other data that may be used to determine a location of the vehicle and/or surrounding objects. As an example, the navigation module 70 may perform triangulation based on signals received from other network devices to determine a location of the vehicle 10. The navigation module 70 and/or the zone module 72 may receive geofencing information from the GPS receiver 16 and/or store and have access to geofences. The geofences refer to data indicating geographical boundaries of regeneration permitted zones and limited and/or regeneration prohibited zones. In one embodiment, the zone module 72 determines and stores the stated zones and provides this information to the navigation module 70. The navigation module 70 may also determine a location of the vehicle 10 relative to the stated zones.

The timing module 74 may determine timing-related information, such as an estimate amount of time remaining in a current zone, an estimated time to next zone, an amount of time to regenerate the PF 26, an amount of time to complete a current regeneration of the PF 26, etc. This may be based on a current speed of the vehicle 10, a heading of the vehicle 10, a predetermined route that the vehicle is following, and/or an expected driving pattern of a driver of the vehicle. The timing-related information is provided to the regeneration module 50, which determines when, where, and whether to regenerate the PF 26 based on this information.

Figure 2:
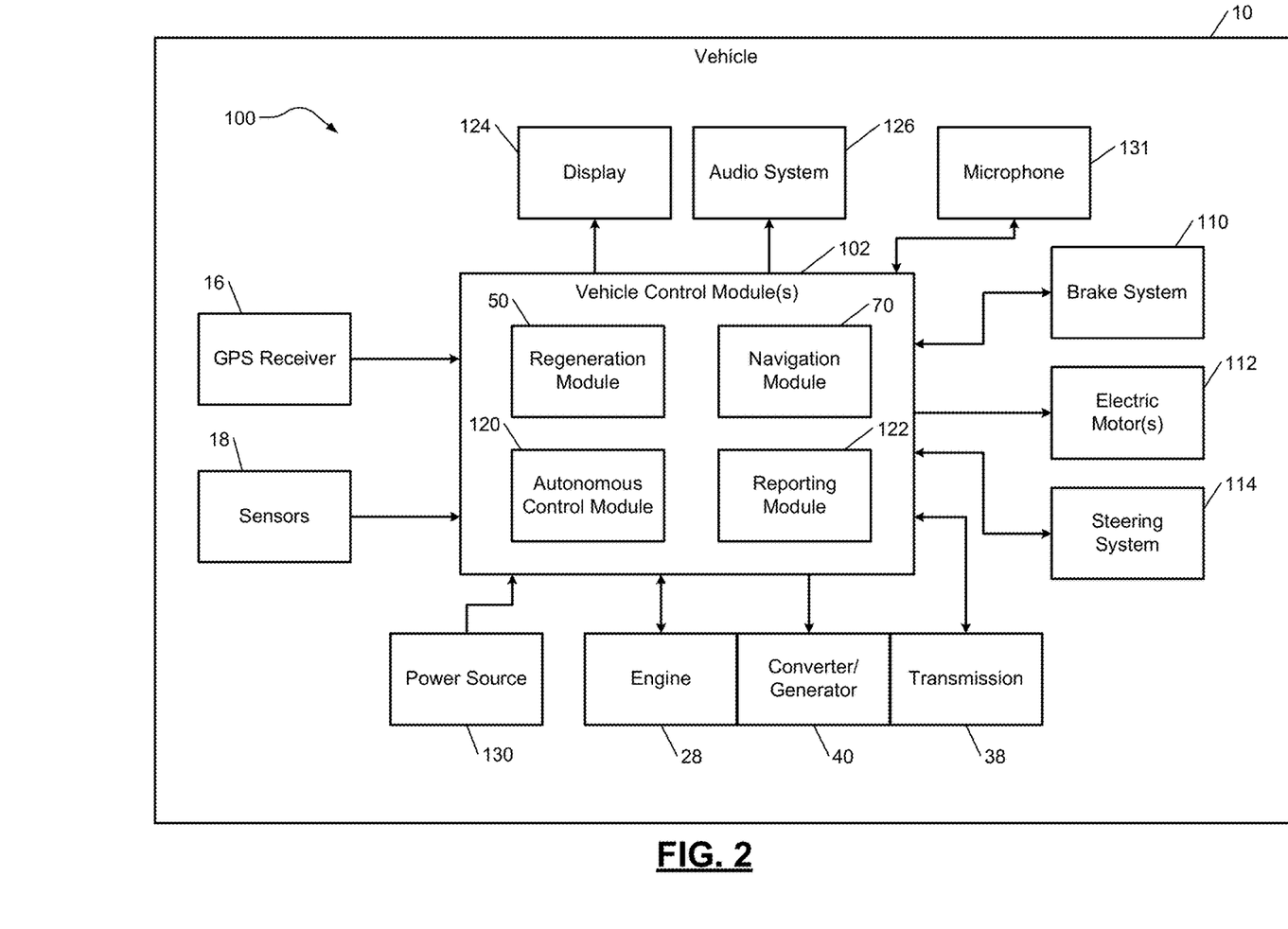
FIG. 2 is a functional block diagram of an example of a vehicle control system including the regeneration module in accordance with an embodiment of the present disclosure.

The regeneration module 50 may (i) signal a vehicle operator when regeneration of the PF 26 is to be performed, (ii) signal a vehicle operator when the PF 26 is due for regeneration, and/or (iii) generate a request signal to request that the vehicle operator drive the vehicle 10 to a regeneration permitted zone. This signaling may be provided via the indicators 22, which may include visual and/or audible indicators. The indicators 22 may include a display and/or an audio system as shown in FIG. 2. The regeneration module 50 may also signal a vehicle service center via the transceiver 24 that the PF 26 is due for regeneration and/or one or more parameters of the PF 26 is expected to or has exceeded or dropped below corresponding predetermined thresholds for the parameters. Examples of the parameters are a pressure differential across the PF 26, one or more temperatures of the PF 26, an average temperature of the PF 26, an inlet pressure of the PF 26, an outlet pressure of the PF 26, a fill level of the PF 26, and a percentage of the PF 26 that is not regenerated.

FIG. 2 shows a vehicle control system 100 of the vehicle 10. The vehicle control system 100 includes the GPS receiver 16, the sensors 18, and one or more vehicle control modules 102 (e.g., the engine control module 20 of FIG. 1). The vehicle control modules 102 may include engine, converter/generator, transmission, brake, steering, electric motor control modules and/or other control modules that control operation of the engine 28, the converter/generator 40, the transmission 38, a brake system 110, one or more electric motor(s) 112, and steering system 114. The engine 28, the converter/generator 40, the transmission 38, the brake system 110, the electric motor(s) 112, and the steering system 114 may include actuators controlled by the vehicle control modules 102 to, for example, adjust fuel, spark, air flow, throttle position, pedal position, etc. This control may be based on the outputs of the GPS receiver 16, the sensors 18, and/or the vehicle control modules 102.

For example, the vehicle control modules 102 may include the regeneration module 50, the navigation module 70, an autonomous control module 120 and a reporting module 122. The regeneration module 50 may determine that regeneration of the PF 26 is due. The navigation module 70 may determine a route for the vehicle 10 to follow to enter a regeneration permitted zone. The autonomous control module 120 may control operation of the engine, 28, the converter/generator 40, the transmission 38, the brake system 110, the electric motors 112, and the steering system 114 to drive the vehicle 10 to the regeneration permitted zone and/or a service center for regeneration. The reporting module 122 may report a state of the PF 26 to a vehicle operator and/or a service center via a display 124, an audio system 126, and/or the transceiver 24 of FIG. 1. The vehicle control modules 102 may receive power from a power source 130 and control power delivery from the power source 130 to the engine 28, the converter/generator 40, the transmission 38, the brake system 110, the electric motor(s) 112, the steering system 114, etc. The vehicle control modules 102 may also receive response signals from a vehicle operator via a microphone 131.

Figure 3:
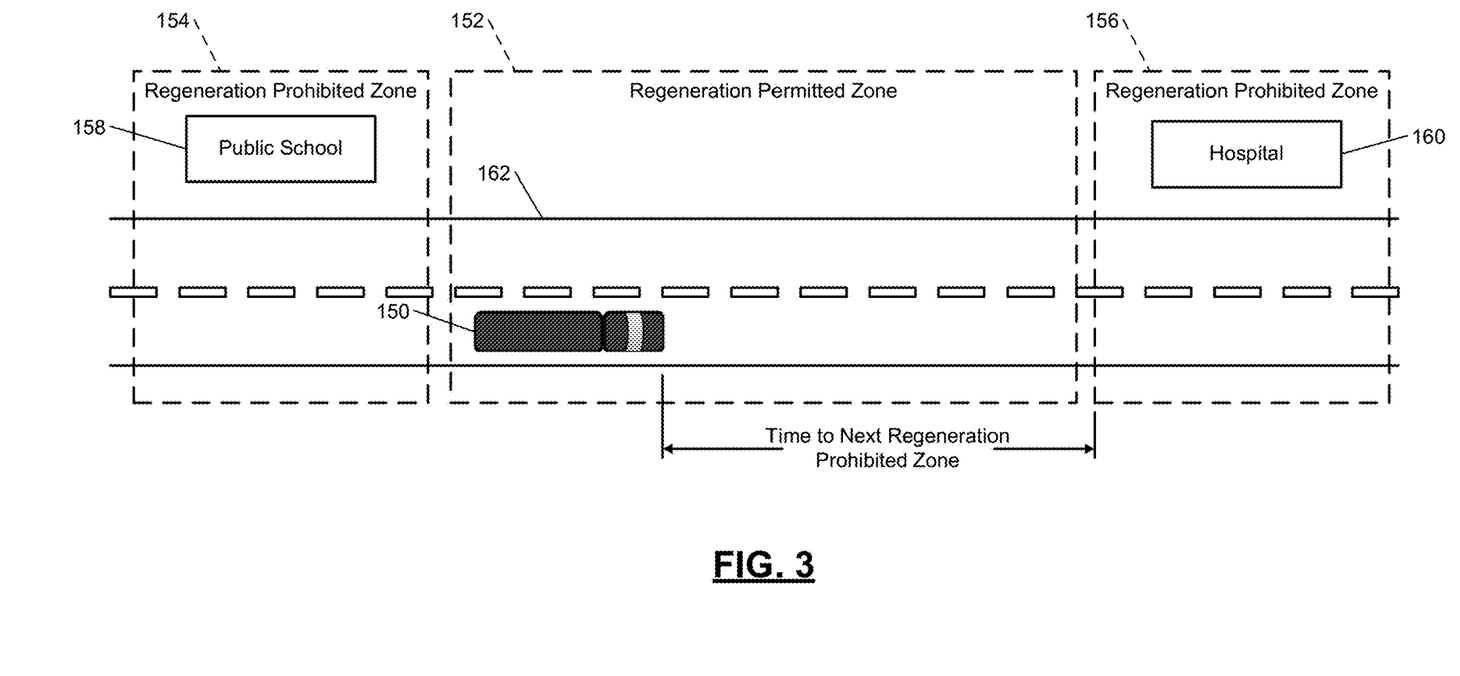
FIG. 3 is a top view of an environment illustrating a vehicle traveling through different types of regeneration zones and controlling particulate filter regeneration timing based on remaining time in a regeneration permitted zone.

FIG. 3 shows a vehicle 150 traveling through different types of regeneration zones and controlling regeneration timing based on remaining time in a regeneration permitted zone 152. Example regeneration prohibited zones 154, 156 are shown and include areas in which a public school 158 and a hospital 160 are located. The vehicle 150 is traveling on a road 162 and passes through the stated zones 152, 154, 156. Regeneration is prevented while in the regeneration prohibited zones 154, 156 and is permitted and/or performed while in the regeneration permitted zone. The vehicle 150 may include the systems 12, 14, 100 of FIGS. 1-2 and control timing of regeneration of a corresponding PF based on the location of the vehicle 150, the speed of the vehicle 150, the time in the regeneration permitted zone, an amount of time remaining in the regeneration permitted zones, etc.

Figure 4:
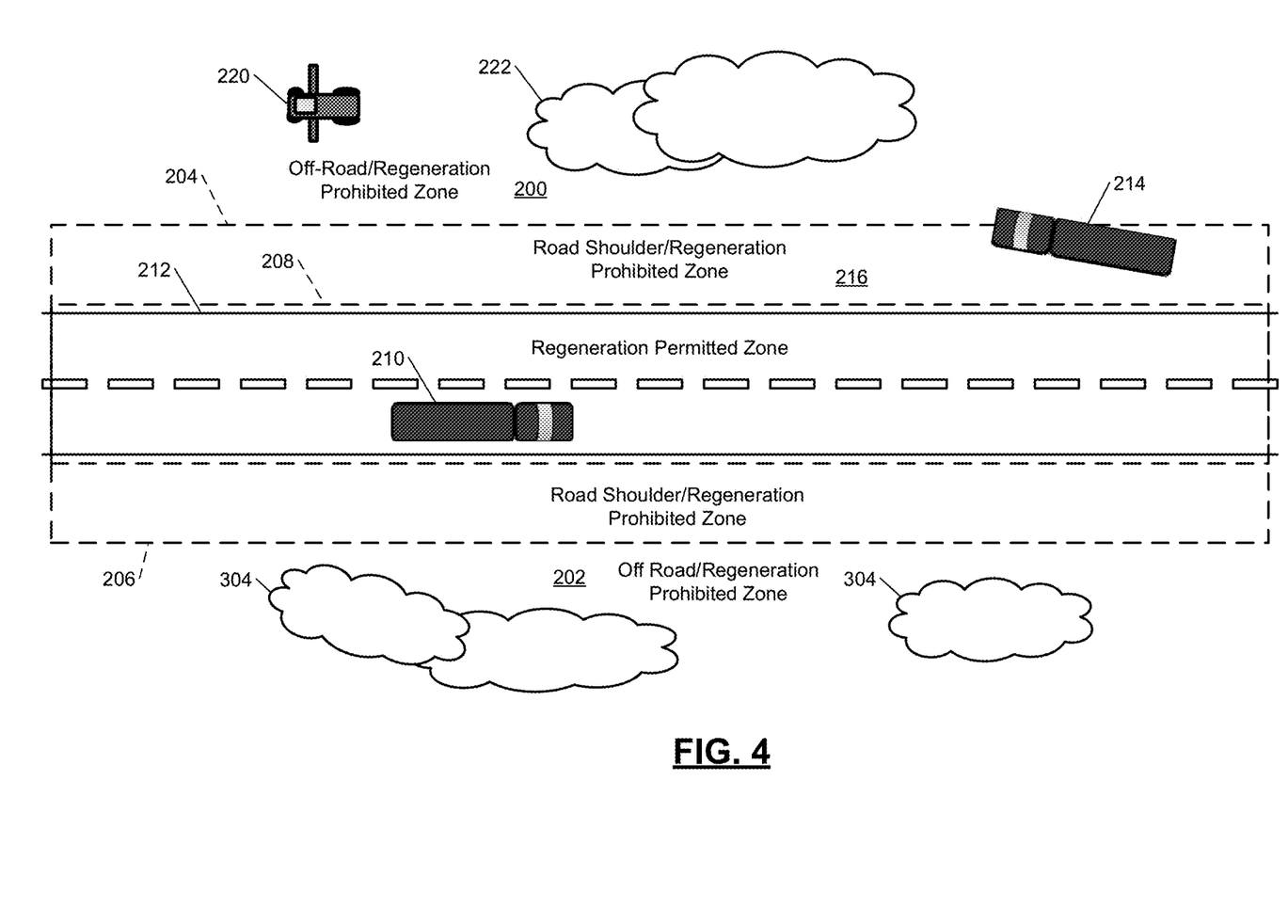
FIG. 4 is a top view of an environment illustrating examples of different types of regeneration zones.

FIG. 4 shows an environment illustrating examples of different types of regeneration zones including off-road regeneration prohibited zones 200, 202, shoulder regeneration prohibited zones 204, 206, on-road regeneration permitted zone 208. A first vehicle 210 is shown on a paved road 212 in the regeneration permitted zone 208. A second vehicle 214 is shown on a shoulder 216 of the road 212 and in the shoulder regeneration prohibited zone 204. An agricultural vehicle 220 (e.g., a tractor) and vegetation 222 are shown in the off-road regeneration prohibited zone 200.

The vehicles 210, 214, 220 may include the systems 12, 14, 100 of FIG. 1 and control regeneration of PFs on the vehicles 210, 214, 220 based on which of the zones in which the vehicles 210, 214, 220 are located. The regeneration module of the vehicle 210 may regenerate the PF of the vehicle 210 while on the road 212 and while in the regeneration permitted zone 208. The agricultural vehicle 220 may proceed from the zone 200 to a nearest allocated paved lot (or surface) at which regeneration is permitted in order to regenerate the PF of the agricultural vehicle 220. The regeneration module of the vehicle 214 may prevent regeneration while the vehicle 214 is in the zone 204. This may include stopping a regeneration process already started prior to entering the zone 204.

Figure 5:
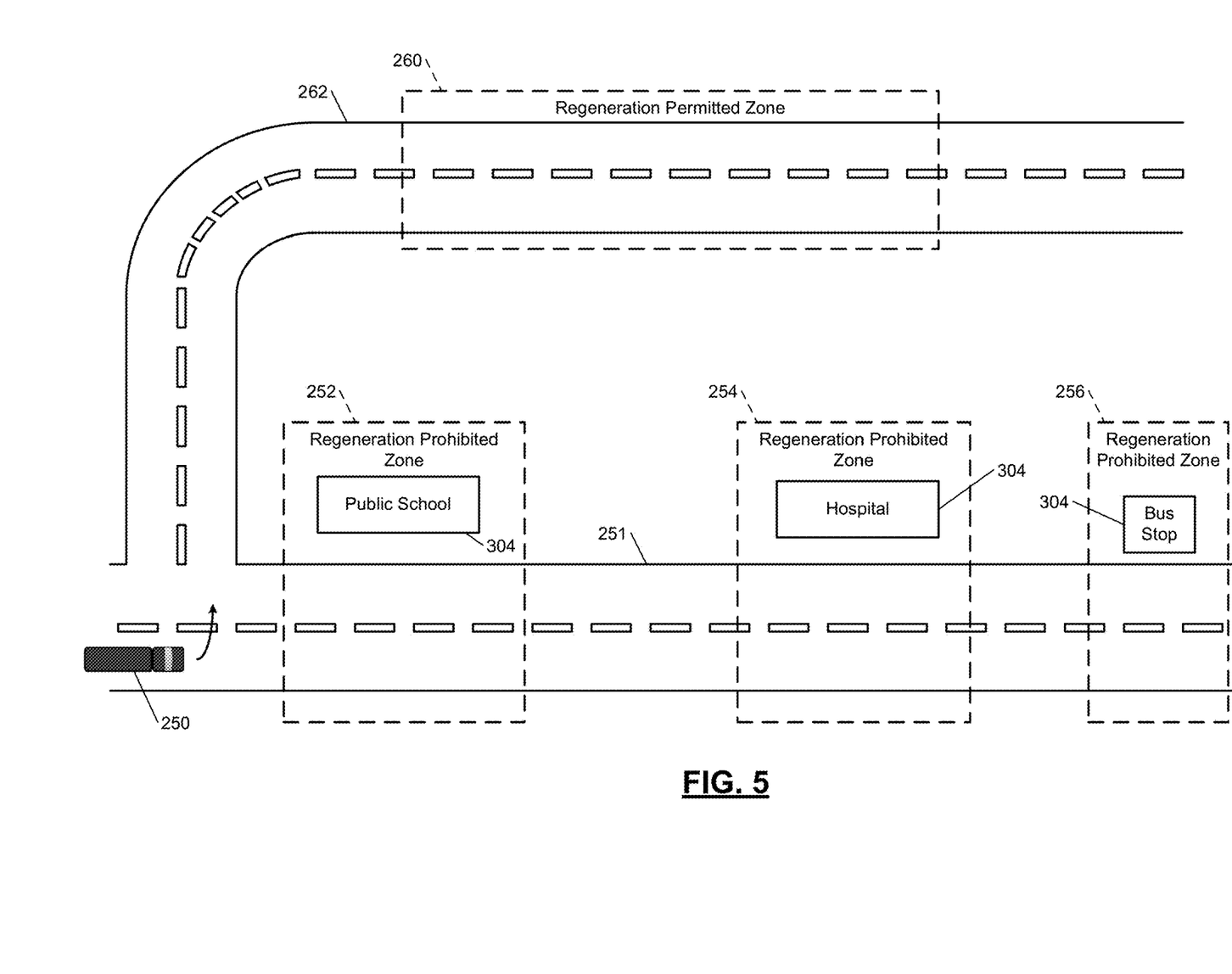
FIG. 5 is top view of an environment illustrating a vehicle managing particulate filter regeneration based on availability of a regeneration permitted zone along different routes.

FIG. 5 shows an environment illustrating a vehicle 250 managing PF regeneration based on availability of a regeneration permitted zone along different routes. The vehicle 250 may include the systems 12, 14, 100 of FIGS. 1-2. The regeneration module of the vehicle 250 may determine that (i) a PF is due for regeneration, and (ii) if the vehicle 250 remains on a current route along road 251, the vehicle 250 will not pass through a regeneration permitted zone prior to a parameter of the PF exceeding a predetermine threshold associated with regenerating the PF. As an example, the current route may include prohibited regeneration zones 252, 254, 256 and distances between these zones may not be long enough for the vehicle 250 traveling at a current speed and/or at expected speeds to complete regeneration of the PF. As another example, the regeneration module may determine that a pressure differential across the PF will exceed a predetermined limit if the vehicle remains on the current route. The predetermined limit may be greater than the predetermined threshold used to indicate that the PF 26 is due for regeneration. The limit may be associated with degraded performance of the PF 26 and/or the engine 28.

To maintain performance of the PF, the regeneration module and/or the corresponding navigation module may determine whether there is an alternative route to follow that includes a regeneration permitted zone. As an example, a regeneration permitted zone 260 is shown along an alternate route 262. The regeneration module, the navigation module and/or the autonomous control module of the vehicle 250 may perform tasks to instruct a driver of the vehicle 250 to take the alternate route and/or control operation of the vehicle 250 to take the alternate route and regenerate the PF in the regeneration permitted zone 260.

Figure 6A:
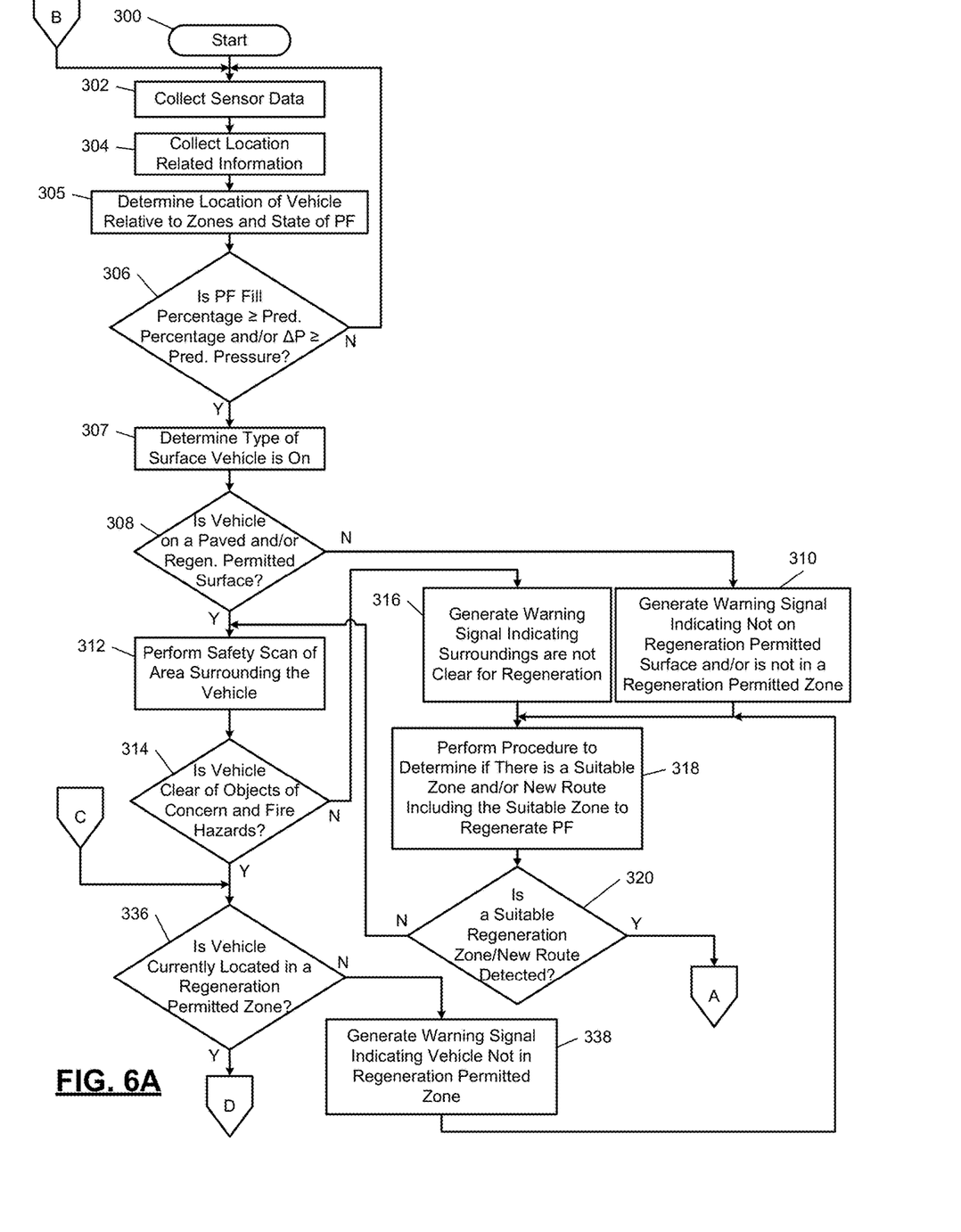
FIG. 6A-6C illustrates an example of a regeneration management method in accordance with an embodiment of the present disclosure.
Figure 6B:
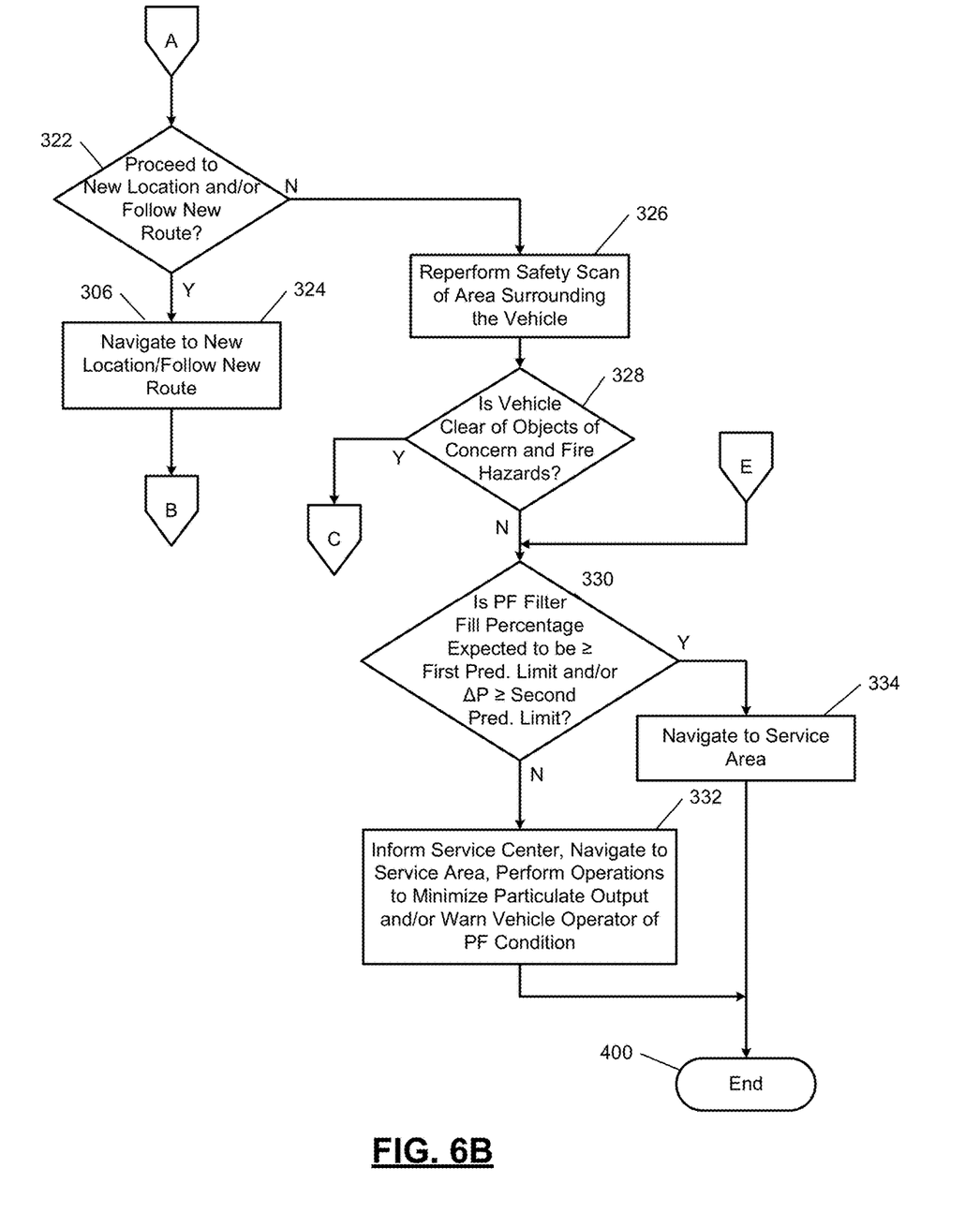
Figure 6C:
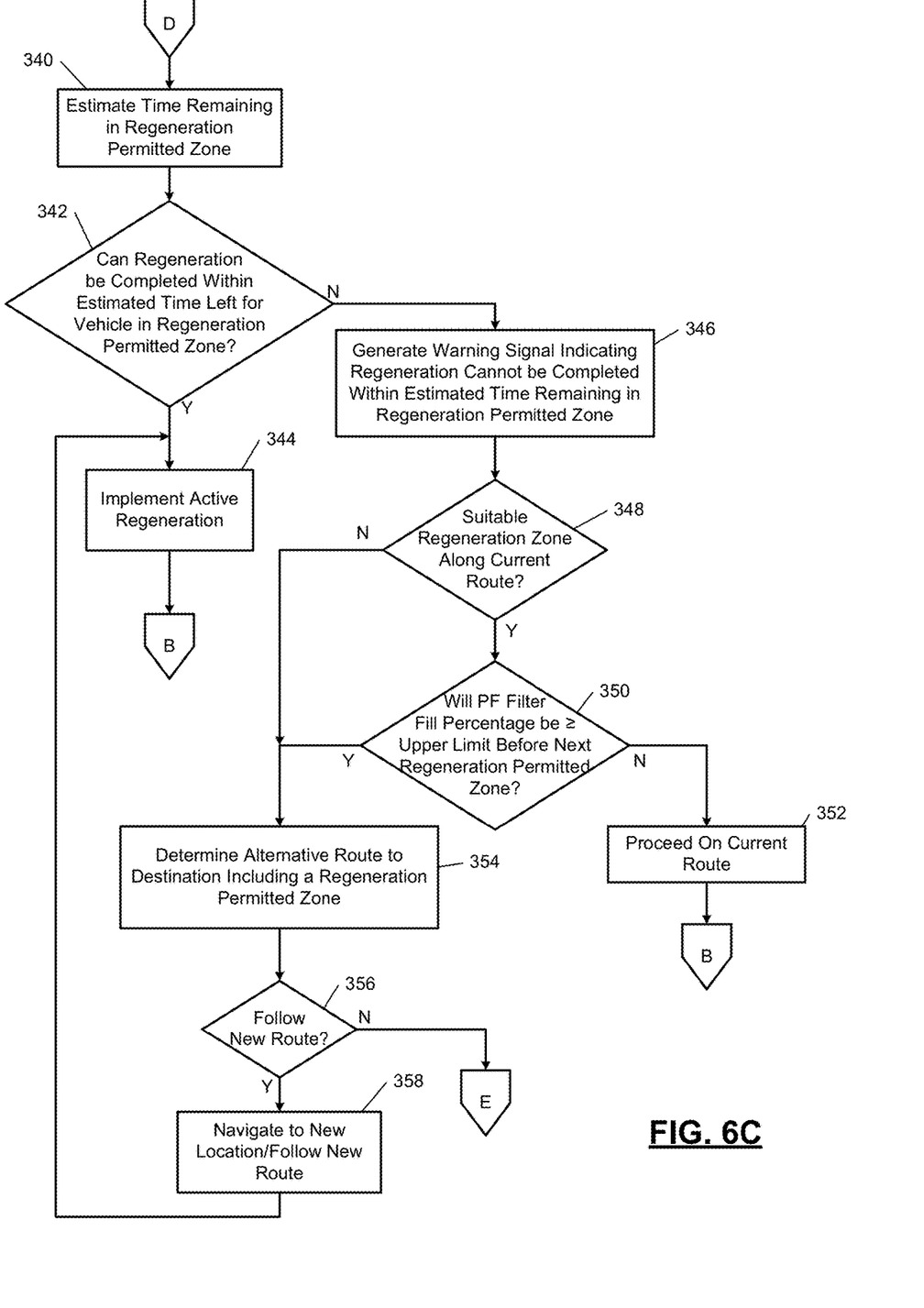

The systems disclosed herein may be operated using numerous methods, an example method is illustrated in FIGS. 6A-6C (collectively referred to as FIG. 6). In FIG. 6, a regeneration management method is shown. Although the following operations of the following method are primarily described with respect to the implementations of FIGS. 1-2, the operations may be easily modified to apply to other implementations of the present disclosure. The operations may be iteratively performed.

The method may begin at 300. At 302, the modules 18, 50, 70, 72, 74, 120 collect sensor data from the sensors 17, 18. At 304, the modules 20, 70, 72, 74 collect location related information as described above. In one embodiment this includes collecting data and information from the GPS receiver 16. This may include location information, zone information, geofence information, etc., as described above.

At 305, the regeneration module 50 determines a location of the vehicle relative to regeneration permitted and prohibited zones and one or more parameters associated with a current state of the PF 26 based on the data and information from the sensors 17, 18. In one embodiment, the transceiver 24 receives signals from network devices transmitting warning, beacon, and/or other signals indicating regeneration prohibited zones and/or not to perform PF regeneration in a particular area or within a predetermined range of an animate or inanimate object. The network devices may be located on a building, a person, an animal, and/or an inanimate object. As an example, a wearable device, a health monitor, or a mobile device on a person may periodically transmit a signal indicating that the person is present, within a certain range of the vehicle 10, and/or is in a certain location. The person may be stationary or moving (e.g., on a bicycle). If the person is moving, then the area in which not to perform regeneration may be changing. This regeneration prohibiting information may also be received during operations 312 and 326. Operations 314 and 328 may be based on this regeneration prohibiting information. Navigation module 70 and the autonomous control module 120 may navigate and/or control operation of the vehicle 10 to prevent regeneration within a predetermined range of the network devices transmitting the regeneration prohibiting signals.

At 306, the regeneration module 50 compares the one or more parameters to predetermined thresholds. This is indicative of whether the PF 26 should be regenerated, should be regenerated within an estimated period of time, and/or should be regenerated after the vehicle 10 travels an estimated number of miles. In the example shown, the regeneration module 50 determines whether (i) a fill percentage of the PF 26 is greater than or equal to a predetermined percentage, and/or (ii) a pressure differential across the PF 26 is greater than or equal to a predetermined pressure differential. If the fill percentage is greater than or equal to the predetermined percentage and/or the pressure differential is greater than or equal to the predetermined pressure differential, then operation 307 is performed. If operation 307 is performed, then the PF 26 should be regenerated, should be regenerated within an estimated period of time, and/or should be regenerated after the vehicle 10 travels an estimated number of miles.

At 307, one of the modules 70, 72 determines a type of surface that the vehicle 10 is on based on the data and information received from the GPS receiver 16 and/or the sensors 17, 18. At 308, one of the modules 70, 72 determines whether the vehicle 10 is on a paved and/or regeneration permitted surface. If the vehicle 10 is not on a paved and/or regeneration permitted surface, operation 310 is performed, otherwise operation 312 is performed. At 310, the regeneration module 50 may generate a warning signal via the indicators 22 indicating that the vehicle is not on a regeneration permitted surface and/or is not in a regeneration permitted zone.

At 312, one of the modules 20, 72, 50 performs a safety scan of an area surrounding the vehicle 10 via, for example the sensors 18 and/or the transceiver 24. This is done to detect objects, types of the objects, vegetation, etc. surrounding the vehicle 10. At 314, one of the modules 20, 72, 50 determines whether the area surrounding the vehicle 10 is clear of objects of concern and/or fire hazards. This may include determining whether the area is clear of (i) humans, (ii) animals, and/or (iii) objects that could catch fire as a result of being exposed to heat and/or exhaust created during regeneration of the PF 26. If the vehicle 10 is not clear of objects of concern and/or fire hazards, operation 316 is performed, otherwise operation 336 is performed.

At 316, the regeneration module 50 may generate a warning signal via the indicators 22 indicating that the surroundings of the vehicle 10 are not clear for regeneration. Subsequent to operations 310, 316, operation 318 may be performed. At 318, one of the modules 70, 72 may perform a procedure to determine if there is a suitable zone and/or a new route that includes the suitable zone to regenerate the PF 26. The suitable zone may be nearby, within a predetermine range of the vehicle 10, along a current route of the vehicle 10, and/or along an alternative route. The suitable zone refers to a zone in which regeneration is permitted and/or provides enough distance to complete regeneration of the PF 26. At 320, one of the modules 70, 72 proceeds to perform operation 322 if there is a suitable (or new) regeneration zone and/or new route detected, otherwise operation 312 is performed.

At 322, one of the modules 70, 120, 122 determines whether to proceed to the new location and/or follow the new route. In one embodiment, the reporting module 122 may generate a request signal via the indicators 22 for the vehicle operator requesting whether to proceed to the new location and/or follow the new route. The vehicle operator may than provide an input response via the indicators 22 (e.g., via the display 124 or the microphone 131). Operation 324 may be performed if the vehicle is to proceed to the new location and/or follow the new route, otherwise operation 326 may be performed.

At 324, the navigation module 70 navigates the vehicle 10 by instructing the vehicle operator with visual and/or audible signals directing the vehicle operator to drive the vehicle 10 to the new location and/or to follow the new route. As an alternative, the autonomous control module 120 controls operation of the vehicle 10 to drive to the new location and/or follow the new route. This may be based on navigation signals received from the navigation module 70. Subsequent to performing operation 324, operation 302 may be performed.

At 326, one of the modules 20, 72, 50 reperforms a safety scan of an area surrounding the vehicle 10 via, for example the sensors 18 and/or the transceiver 24. At 328, one of the modules 20, 72, 50 determines whether the area surrounding the vehicle 10 is clear of objects of concern and/or fire hazards. If the area is not cleared, operation 330 is performed, otherwise operation 336 is performed.

At 330, the regeneration module 50 determines whether parameters of the PF 26 are such to indicate that the fill level of the PF 26 is expected to exceed a first predetermined limit and/or the pressure differential across the PF 26 is expected to exceed a second predetermined limit. These limits may be greater than the predetermined thresholds used to indicate that the PF 26 is due for regeneration. The limits may be associated with degraded performance of the PF 26 and/or the engine 28. The regeneration module 50 determines whether one or more of these limits are expected to be exceeded prior to the vehicle 10 reaching a regeneration zone in which the PF 26 can be regenerated. If one or more of the limits are not to be exceeded, operation 332 is performed, otherwise operation 334 is performed.

At 332, one or more operations are performed including: the regeneration module 50 via the transceiver 24 informing a service center that the one or more limits are to be exceeded; the modules 70, 120 navigating and/or controlling operation of the vehicle 10 to drive to the service center; the regeneration module 50 and/or the engine control module 20 performing operations to minimize particulate output of the engine 28; and/or the regeneration module 50 warning the vehicle operator of a state of the PF 26. At 334, the modules 70, 120 navigate and/or control operation of the vehicle 10 to drive to the service center. The method may end at 400 subsequent to performing operations 332, 334 as shown or may return to operation 302.

At 336, one of the modules 70, 72 determines whether the vehicle 10 is in a regeneration permitted zone. If the vehicle 10 is not in a regeneration permitted zone, operation 338 is performed, otherwise operation 340 is performed. At 338, one of the modules 50, 122 via the indicators 22 generates a warning signal indicating that the vehicle 10 is not in a regeneration permitted zone.

At 340, the timing module 74 estimates time remaining in the regeneration permitted zone. At 342, the timing module 74 and/or the regeneration module 50 determines whether regeneration (e.g., active regeneration) can be completed within the estimated time left in the regeneration permitted zone. If regeneration can be completed, operation 344 is performed, otherwise operation 346 is performed. At 344, the regeneration module 50 regenerates the PF 26 in current or new regeneration permitted zone depending on whether operation 344 is performed subsequent to operation 342 or operation 358. Operation 302 may be performed subsequent to operation 344.

At 346, one of the modules 50, 122 generates a warning signal via the indicators 22 indicating that regeneration cannot be completed within the estimated remaining time in the current regeneration permitted zone. At 348, the zone module 72 determines if there is a next suitable regeneration zone along a current route of the vehicle 10 to regenerate the PF 26. If there is a suitable regeneration zone along the current route, then operation 350 is performed, otherwise operation 354 is performed.

At 350, one of the modules 50, 74 determines whether parameters of the PF 26 indicate that one or more of the predetermined limits are to be exceeded prior to the vehicle 10 entering the suitable regeneration zone. If one or more of the limits are to be exceeded prior to entering the suitable regeneration zone, operation 354 is performed, otherwise operation 352 is performed.

At 352, the navigation module 76 and/or the autonomous control module 120 navigates and/or controls operation of the vehicle 10 to continue on the current route. Operation 302 may be performed subsequent to operation 352.

At 354, one of the modules 70, 72 determines an alternative (or new) route to a destination that includes a regeneration permitted zone. At 356, one of the modules 50, 70 determines whether to proceed to the new location having regeneration permitted zone and/or follow new route including the regeneration permitted zone. In one embodiment, the reporting module 122 may generate a request signal via the indicators 22 to the vehicle operator requesting whether to proceed to new location and/or follow new route. The vehicle operator may than provide an input response via the indicators 22 (e.g., via the display 124 or the microphone 131). If the vehicle 10 is to proceed to the new location and/or follow new route, then operation 358 is performed, otherwise operation 330 may be performed.

At 358, the modules 70, 120 navigate and/or control operation of the vehicle 10, such that the vehicle 10 drives to the new location of regeneration permitted zone and/or to follow new route having the regeneration permitted zone. Operation 344 may be performed subsequent to operation 358.

The above-described operations of FIG. 6 are meant to be illustrative examples; the operations may be performed sequentially, synchronously, simultaneously, continuously, during overlapping time periods or in a different order depending upon the application. Also, any of the operations may not be performed or skipped depending on the implementation and/or sequence of events.

The foregoing description is merely illustrative in nature and is in no way intended to limit the disclosure, its application, or uses. The broad teachings of the disclosure can be implemented in a variety of forms. Therefore, while this disclosure includes particular examples, the true scope of the disclosure should not be so limited since other modifications will become apparent upon a study of the drawings, the specification, and the following claims. It should be understood that one or more steps within a method may be executed in different order (or concurrently) without altering the principles of the present disclosure. Further, although each of the embodiments is described above as having certain features, any one or more of those features described with respect to any embodiment of the disclosure can be implemented in and/or combined with features of any of the other embodiments, even if that combination is not explicitly described. In other words, the described embodiments are not mutually exclusive, and permutations of one or more embodiments with one another remain within the scope of this disclosure.

Spatial and functional relationships between elements (for example, between modules, circuit elements, semiconductor layers, etc.) are described using various terms, including "connected," "engaged," "coupled," "adjacent," "next to," "on top of," "above," "below," and "disposed." Unless explicitly described as being "direct," when a relationship between first and second elements is described in the above disclosure, that relationship can be a direct relationship where no other intervening elements are present between the first and second elements, but can also be an indirect relationship where one or more intervening elements are present (either spatially or functionally) between the first and second elements. As used herein, the phrase at least one of A, B, and C should be construed to mean a logical (A OR B OR C), using a non-exclusive logical OR, and should not be construed to mean "at least one of A, at least one of B, and at least one of C."

In the figures, the direction of an arrow, as indicated by the arrowhead, generally demonstrates the flow of information (such as data or instructions) that is of interest to the illustration. For example, when element A and element B exchange a variety of information but information transmitted from element A to element B is relevant to the illustration, the arrow may point from element A to element B. This unidirectional arrow does not imply that no other information is transmitted from element B to element A. Further, for information sent from element A to element B, element B may send requests for, or receipt acknowledgements of, the information to element A.

In this application, including the definitions below, the term "module" or the term "controller" may be replaced with the term "circuit." The term "module" refers to, is part of, or includes: an Application Specific Integrated Circuit (ASIC); a digital, analog, or mixed analog/digital discrete circuit; a digital, analog, or mixed analog/digital integrated circuit; a combinational logic circuit; a field programmable gate array (FPGA); a processor circuit (shared, dedicated, or group) that executes code; a memory circuit (shared, dedicated, or group) that stores code executed by the processor circuit; other suitable hardware components that provide the described functionality; or a combination of some or all of the above, such as in a system-on-chip.

The module may include one or more interface circuits. In some examples, the interface circuits may include wired or wireless interfaces that are connected to a local area network (LAN), the Internet, a wide area network (WAN), or combinations thereof. The functionality of any given module of the present disclosure may be distributed among multiple modules that are connected via interface circuits. For example, multiple modules may allow load balancing. In a further example, a server (also known as remote, or cloud) module may accomplish some functionality on behalf of a client module.

The term code, as used above, may include software, firmware, and/or microcode, and may refer to programs, routines, functions, classes, data structures, and/or objects. The term shared processor circuit encompasses a single processor circuit that executes some or all code from multiple modules. The term group processor circuit encompasses a processor circuit that, in combination with additional processor circuits, executes some or all code from one or more modules. References to multiple processor circuits encompass multiple processor circuits on discrete dies, multiple processor circuits on a single die, multiple cores of a single processor circuit, multiple threads of a single processor circuit, or a combination of the above. The term shared memory circuit encompasses a single memory circuit that stores some or all code from multiple modules. The term group memory circuit encompasses a memory circuit that, in combination with additional memories, stores some or all code from one or more modules.

The term memory circuit is a subset of the term computer-readable medium. The term computer-readable medium, as used herein, does not encompass transitory electrical or electromagnetic signals propagating through a medium (such as on a carrier wave); the term computer-readable medium may therefore be considered tangible and non-transitory. Non-limiting examples of a non-transitory, tangible computer-readable medium are nonvolatile memory circuits (such as a flash memory circuit, an erasable programmable read-only memory circuit, or a mask read-only memory circuit), volatile memory circuits (such as a static random access memory circuit or a dynamic random access memory circuit), magnetic storage media (such as an analog or digital magnetic tape or a hard disk drive), and optical storage media (such as a CD, a DVD, or a Blu-ray Disc).

The apparatuses and methods described in this application may be partially or fully implemented by a special purpose computer created by configuring a general purpose computer to execute one or more particular functions embodied in computer programs. The functional blocks, flowchart components, and other elements described above serve as software specifications, which can be translated into the computer programs by the routine work of a skilled technician or programmer.

The computer programs include processor-executable instructions that are stored on at least one non-transitory, tangible computer-readable medium. The computer programs may also include or rely on stored data. The computer programs may encompass a basic input/output system (BIOS) that interacts with hardware of the special purpose computer, device drivers that interact with particular devices of the special purpose computer, one or more operating systems, user applications, background services, background applications, etc.

The computer programs may include: (i) descriptive text to be parsed, such as HTML (hypertext markup language), XML (extensible markup language), or JSON (JavaScript Object Notation) (ii) assembly code, (iii) object code generated from source code by a compiler, (iv) source code for execution by an interpreter, (v) source code for compilation and execution by a just-in-time compiler, etc. As examples only, source code may be written using syntax from languages including C, C++, C#, Objective-C, Swift, Haskell, Go, SQL, R, Lisp, Java®, Fortran, Perl, Pascal, Curl, OCaml, Javascript®, HTML5 (Hypertext Markup Language 5th revision), Ada, ASP (Active Server Pages), PHP (PHP: Hypertext Preprocessor), Scala, Eiffel, Smalltalk, Erlang, Ruby, Flash®, Visual Basic®, Lua, MATLAB, SIMULINK, and Python®.

None of the elements recited in the claims are intended to be a means-plus-function element within the meaning of 35 U.S.C. § 112(f) unless an element is expressly recited using the phrase "means for," or in the case of a method claim using the phrases "operation for" or "step for."

What is claimed is:

1. A regeneration compliance system comprising:
a navigation module configured to determine a location of a vehicle;
a regeneration module configured to (i) determine a state of a particulate filter of an exhaust system of an engine of the vehicle; and (ii) determine whether to regenerate the particulate filter based on the state of the particulate filter;
a zone module configured to, based on the location of the vehicle, determine (i) whether the vehicle is in one of a plurality of filter regeneration permitted zones, and (ii) where the plurality of filter regeneration permitted zones and filter regeneration prohibited zones are located relative to the vehicle, wherein each of the filter regeneration permitted zones refers to a geographical area in which regeneration is permitted, and a filter regeneration prohibited zone refers to a geographical area in which regeneration is limited or prohibited due to emission regulations; and
a timing module configured to estimate at least one of (i) time to a next one of the plurality of filter regeneration permitted zones, or (ii) an amount of time remaining in a current one of the filter regeneration permitted zones, wherein the regeneration module is configured to control when the particulate filter is regenerated based on (i) the state of the particulate filter, and (ii) at least one of the time to the next one of the plurality of filter regeneration permitted zones or the amount of time remaining in the current one of the plurality of filter regeneration permitted zones.

2. The regeneration compliance system of claim 1, wherein:
the zone module is configured to determine whether the vehicle is on a paved or regeneration permitted surface; and
the regeneration module is configured to regenerate the particulate filter when the vehicle is on a paved or regeneration permitted surface.

3. The regeneration compliance system of claim 1, wherein the navigation module is configured to perform navigation operations to direct the vehicle to the next one of the plurality of filter regeneration permitted zones in response to the regeneration module determining the particulate filter is due for regeneration.

4. The regeneration compliance system of claim 1, further comprising an autonomous control module configured to control operation of the vehicle to drive the vehicle to the next one of the plurality of filter regeneration permitted zones for regeneration of the particulate filter.

5. The regeneration compliance system of claim 1, wherein:
the zone module is configured to determine whether there is one of the plurality of filter regeneration permitted zones along a current route of the vehicle; and
the navigation module is configured to perform navigation operations to direct the vehicle to follow the current route if (i) there is one of the plurality of filter regeneration permitted zones along the current route, and (ii) regeneration of the particulate filter is completed in a predetermined period of time without a parameter of the particulate filter exceeding a predetermined limit.

6. The regeneration compliance system of claim 5, wherein the parameter is a fill percentage of the particulate filter or a pressure differential across the particulate filter.

7. The regeneration compliance system of claim 5, wherein the navigation module is configured to (i) determine a new route for the vehicle if regeneration of the particulate filter cannot be completed along the current route within the predetermined period of time, wherein the new route has one of the plurality of filter regeneration permitted zones, and (ii) perform operations to direct the vehicle along the new route.

8. The regeneration compliance system of claim 7, further comprising an autonomous control module configured to control operation of the vehicle to drive along the new route.

9. The regeneration compliance system of claim 1, wherein:
the timing module, in estimating the time to the next one of the plurality of filter regeneration permitted zones, estimates mileage to the next one of the plurality of filter regeneration permitted zones; and
the regeneration module controls when the particulate filter is regenerated based on the mileage to the next one of the plurality of filter regeneration permitted zones.

10. The regeneration compliance system of claim 1, further comprising:
the global positioning system receiver; and
sensors configured to determine parameters corresponding to a state of the particulate filter,
wherein the regeneration module is configured to determine the state of the particulate filter based on the parameters.

11. A method of controlling timing and location of regeneration of a particulate filter of an exhaust system of an engine of a vehicle, the method comprising:
determining a location of the vehicle;
determining a state of the particulate filter;
determining whether to regenerate the particulate filter based on the state of the particulate filter;
determining whether the vehicle is in one of a plurality of filter regeneration permitted zones based on the location of the vehicle, wherein each of the plurality of filter regeneration permitted zones refers to a geographical area in which regeneration is permitted;
determining where the plurality of filter regeneration permitted zones and filter regeneration prohibited zones are located relative to the vehicle, wherein a filter regeneration prohibited zone refers to a geographical area in which regeneration is limited or prohibited due to emission regulations;
estimating at least one of (i) time to a next one of the plurality of filter regeneration permitted zones, or (ii) an amount of time remaining in a current one of the plurality of filter regeneration permitted zones; and
controlling when the particulate filter is regenerated based on (i) the state of the particulate filter, and (ii) at least one of the time to the next one of the plurality of filter regeneration permitted zones or the amount of time remaining in the current one of the plurality of filter regeneration permitted zones.

12. The method of claim 11, further comprising:
determining whether the vehicle is on a paved or regeneration permitted surface; and
regenerating the particulate filter when the vehicle is on a paved or regeneration permitted surface.

13. The method of claim 11, further comprising performing navigation operations to direct the vehicle to the next one of the plurality of filter regeneration permitted zones in response to determining the particulate filter is due for regeneration.

14. The method of claim 11, further comprising controlling operation of the vehicle to drive the vehicle to the next one of the plurality of filter regeneration permitted zones for regeneration of the particulate filter.

15. The method of claim 11, further comprising:
determining whether there is one of the plurality of filter regeneration permitted zones along a current route of the vehicle; and
performing navigation operations to direct the vehicle to follow the current route if (i) there is one of the plurality of filter regeneration permitted zones along the current route, and (ii) regeneration of the particulate filter can be completed in a predetermined period of time without a parameter of the particulate filter exceeding a predetermined limit.

16. The method of claim 15, wherein the parameter is a fill percentage of the particulate filter or a pressure differential across the particulate filter.

17. The method of claim 15, further comprising:
determining a new route for the vehicle if regeneration of the particulate filter cannot be completed along the current route within the predetermined period of time, wherein the new route has one of the plurality of filter regeneration permitted zones; and
performing operations to direct the vehicle along the new route.

18. The method of claim 17, further comprising controlling operation of the vehicle to drive along the new route.

19. The method of claim 11, further comprising:
while estimating the time to the next one of the plurality of filter regeneration permitted zones, estimating mileage to the next one of the plurality of filter regeneration permitted zones; and
controlling when the particulate filter is regenerated based on the mileage to the next one of the plurality of filter regeneration permitted zones.

20. The method of claim 11, further comprising:
determining parameters corresponding to a state of the particulate filter;
determine the state of the particulate filter based on the parameters;
determining whether the vehicle is on a regeneration permitted surface;
performing a safety scan of an area surrounding the vehicle if the vehicle is on a regeneration permitted surface;
permitting regeneration of the particulate filter if a result of the safety scan indicates that the area is free of objects or fire hazards; and preventing regeneration of the particulate filter if a result of the safety scan indicates that the area is not free of objects or fire hazards.

* * * * *